(12) United States Patent
Rossmark et al.

(10) Patent No.: US 11,935,126 B2
(45) Date of Patent: Mar. 19, 2024

(54) RETAIL LOCATION SERVICES

(71) Applicant: Allstate Insurance Company, Northbrook, IL (US)

(72) Inventors: Sharon Rossmark, Northbrook, IL (US); Kevin Littlejohn, Lindenhurst, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

(21) Appl. No.: 17/236,770

(22) Filed: Apr. 21, 2021

(65) Prior Publication Data

US 2021/0312563 A1    Oct. 7, 2021

Related U.S. Application Data

(63) Continuation of application No. 16/298,263, filed on Mar. 11, 2019, now Pat. No. 11,004,153, which is a
(Continued)

(51) Int. Cl.
*G06Q 40/08* (2012.01)
*G06Q 10/06* (2023.01)
(Continued)

(52) U.S. Cl.
CPC .......... *G06Q 40/08* (2013.01); *G06Q 10/06* (2013.01); *G06Q 10/0631* (2013.01);
(Continued)

(58) Field of Classification Search
None
See application file for complete search history.

(56) References Cited

U.S. PATENT DOCUMENTS

| 5,490,097 A | 2/1996 | Swenson et al. |
| 6,681,985 B1 | 1/2004 | Curtin et al. |

(Continued)

FOREIGN PATENT DOCUMENTS

| EP | 1585045 A1 | 10/2005 |
| JP | 2002108978 A | 4/2002 |

(Continued)

OTHER PUBLICATIONS

Beyond Webcam: a Site-Web-Site for Building Construction, S Nuntasunti, L Bernold—Nist Special Publication SP, 2003—academia.edu.*

(Continued)

*Primary Examiner* — Ariel J Yu
(74) *Attorney, Agent, or Firm* — Polsinelli PC (57) ABSTRACT

Methods of preparing retail establishments are disclosed. An area for a retail location may be chosen and an individual may be selected to manage the retail location. The selection of the area may include an evaluation of geographical factors. From the area, a retail location may be selected based on an aggregate score of a set of characteristics of the retail location. The individual may remotely select the layout and furnishing of the retail location and may remotely monitor the progress of the preparation of the retail location. In an embodiment, the individual may be prepared to manage the retail location at a centralized location that is distinct from the area where the retail location is located.

20 Claims, 8 Drawing Sheets

Related U.S. Application Data continuation of application No. 15/266,546, filed on Sep. 15, 2016, now Pat. No. 10,255,640, which is a continuation of application No. 13/184,173, filed on Jul. 15, 2011, now Pat. No. 9,483,767, which is a continuation of application No. 11/488,356, filed on Jul. 18, 2006, now Pat. No. 8,041,648.

(60) Provisional application No. 60/773,946, filed on Feb. 16, 2006, provisional application No. 60/743,295, filed on Feb. 15, 2006.

(51) Int. Cl.
  G06Q 10/0631 (2023.01)
  G06Q 10/087 (2023.01)
  G06Q 30/00 (2023.01)
  G06Q 50/16 (2012.01)

(52) U.S. Cl.
  CPC ... *G06Q 10/063114* (2013.01); *G06Q 10/087* (2013.01); *G06Q 30/00* (2013.01); *G06Q 50/163* (2013.01)

(56) References Cited

U.S. PATENT DOCUMENTS

| | | | |
|---|---|---|---|
| 7,130,865 B2 | 10/2006 | Moore | |
| 7,353,183 B1 | 4/2008 | Musso | |
| 7,412,398 B1 | 8/2008 | Bailey | |
| 7,447,685 B2 | 11/2008 | Nye | |
| 7,496,886 B2 | 2/2009 | Puttaswamy et al. | |
| 7,822,751 B2 | 10/2010 | O'Clair et al. | |
| 7,877,286 B1 | 1/2011 | Neal et al. | |
| 7,933,929 B1 | 4/2011 | McClendon et al. | |
| 8,010,404 B1 | 8/2011 | Wu et al. | |
| 8,041,648 B2 | 10/2011 | Rossmark et al. | |
| 8,219,535 B1 | 7/2012 | Kobori et al. | |
| 8,655,595 B1 | 2/2014 | Green et al. | |
| 8,805,805 B1 | 8/2014 | Kobori et al. | |
| 8,880,611 B1 | 11/2014 | Lim et al. | |
| 8,938,432 B2 | 1/2015 | Rossmark et al. | |
| 9,483,767 B2 | 11/2016 | Rossmark et al. | |
| 9,619,816 B1 | 4/2017 | Kobori et al. | |
| 11,545,852 B1 | 1/2023 | Caruso et al. | |
| 2001/0056507 A1 | 12/2001 | Bartkowiak et al. | |
| 2002/0010667 A1 | 1/2002 | Kant et al. | |
| 2002/0035535 A1 | 3/2002 | Brock | |
| 2002/0062346 A1 | 5/2002 | Chen | |
| 2002/0069090 A1 | 6/2002 | De Grosz et al. | |
| 2002/0076085 A1 | 6/2002 | Shimazu | |
| 2002/0077842 A1 | 6/2002 | Charisius et al. | |
| 2002/0083024 A1 | 6/2002 | Myers | |
| 2002/0147613 A1 | 10/2002 | Kennard et al. | |
| 2002/0161609 A1 | 10/2002 | Zizzamia et al. | |
| 2002/0169622 A1 | 11/2002 | Estridge | |
| 2002/0188480 A1 | 12/2002 | Liebeskind et al. | |
| 2002/0194033 A1 | 12/2002 | Huff | |
| 2002/0198755 A1 | 12/2002 | Birkner et al. | |
| 2002/0198760 A1 | 12/2002 | Carpenter et al. | |
| 2003/0033195 A1 | 2/2003 | Bruce et al. | |
| 2003/0088562 A1 | 5/2003 | Dillon et al. | |
| 2003/0125990 A1 | 7/2003 | Rudy et al. | |
| 2003/0177072 A1 | 9/2003 | Bared | |
| 2003/0187740 A1 | 10/2003 | Tanahashi et al. | |
| 2003/0208401 A1 | 11/2003 | Karsten | |
| 2003/0212621 A1 | 11/2003 | Poulter et al. | |
| 2004/0044549 A1 | 3/2004 | Loop | |
| 2004/0110515 A1 | 6/2004 | Blumberg et al. | |
| 2004/0117358 A1 | 6/2004 | von Kaenel et al. | |
| 2004/0117361 A1 | 6/2004 | Greer et al. | |
| 2004/0138953 A1 | 7/2004 | Van Luchene et al. | |
| 2004/0153346 A1 | 8/2004 | Grundel et al. | |
| 2004/0162752 A1 | 8/2004 | Dean et al. | |
| 2004/0177029 A1 | 9/2004 | Hammour et al. | |
| 2004/0186755 A1 | 9/2004 | Roche | |
| 2004/0186797 A1 | 9/2004 | Schwind et al. | |
| 2004/0193611 A1 | 9/2004 | Raghunandhan | |
| 2004/0210594 A1 | 10/2004 | Gosselin | |
| 2004/0230467 A9 | 11/2004 | Gailey et al. | |
| 2004/0267743 A1 | 12/2004 | Dasari et al. | |
| 2005/0043971 A1 | 2/2005 | Hendrickson et al. | |
| 2005/0071203 A1 | 3/2005 | Maus | |
| 2005/0071247 A1 | 3/2005 | Kelley et al. | |
| 2005/0076013 A1 | 4/2005 | Hilbert et al. | |
| 2005/0080716 A1 | 4/2005 | Belyi et al. | |
| 2005/0096971 A1 | 5/2005 | Baechtiger | |
| 2005/0096972 A1 | 5/2005 | Baechtiger | |
| 2005/0136838 A1 | 6/2005 | Kim et al. | |
| 2005/0149438 A1 | 7/2005 | Williams | |
| 2005/0187868 A1 | 8/2005 | Aspelin et al. | |
| 2005/0198354 A1 | 9/2005 | Holloway | |
| 2005/0222883 A1 | 10/2005 | Goldberg et al. | |
| 2005/0222924 A1 | 10/2005 | Sumino et al. | |
| 2005/0240512 A1 | 10/2005 | Quintero et al. | |
| 2005/0262062 A1 | 11/2005 | Xia | |
| 2005/0278313 A1 | 12/2005 | Plow et al. | |
| 2005/0283503 A1 | 12/2005 | Hancock et al. | |
| 2005/0288958 A1 | 12/2005 | Eraker et al. | |
| 2006/0005147 A1 | 1/2006 | Hammack et al. | |
| 2006/0026069 A1* | 2/2006 | Mazurkiewicz | G06Q 30/02 705/14.42 |
| 2006/0036524 A1 | 2/2006 | Capanna | |
| 2006/0064330 A1 | 3/2006 | Sumino et al. | |
| 2006/0080146 A1 | 4/2006 | Cook et al. | |
| 2006/0085392 A1 | 4/2006 | Wang et al. | |
| 2006/0100912 A1 | 5/2006 | Kumar et al. | |
| 2006/0116905 A1 | 6/2006 | Yered | |
| 2006/0136273 A1 | 6/2006 | Zizzamia et al. | |
| 2006/0155627 A1 | 7/2006 | Horowitz | |
| 2006/0174302 A1 | 8/2006 | Mattern et al. | |
| 2006/0195365 A1 | 8/2006 | Karabetsos | |
| 2006/0206362 A1 | 9/2006 | Rudy et al. | |
| 2006/0206438 A1 | 9/2006 | Sakaue et al. | |
| 2006/0235724 A1 | 10/2006 | Rosenthal | |
| 2006/0242024 A1 | 10/2006 | Mattingly et al. | |
| 2006/0253316 A1 | 11/2006 | Blackshaw et al. | |
| 2006/0253345 A1 | 11/2006 | Heber | |
| 2006/0271531 A1 | 11/2006 | O'Clair et al. | |
| 2006/0273884 A1 | 12/2006 | Watkins et al. | |
| 2006/0282286 A1 | 12/2006 | Faris et al. | |
| 2006/0287896 A1 | 12/2006 | McComb et al. | |
| 2007/0016542 A1 | 1/2007 | Rosauer et al. | |
| 2007/0027727 A1 | 2/2007 | Cochrane | |
| 2007/0073610 A1 | 3/2007 | Marugabandhu et al. | |
| 2007/0094038 A1 | 4/2007 | Kling et al. | |
| 2007/0100724 A1 | 5/2007 | Hollas et al. | |
| 2007/0112622 A1 | 5/2007 | Meggs | |
| 2007/0112791 A1 | 5/2007 | Harvey et al. | |
| 2007/0130026 A1 | 6/2007 | O'Pray et al. | |
| 2007/0198384 A1 | 8/2007 | Prouty | |
| 2007/0203759 A1 | 8/2007 | Mathai et al. | |
| 2007/0295560 A1 | 12/2007 | Heckel et al. | |
| 2008/0086356 A1 | 4/2008 | Glassman et al. | |
| 2015/0088566 A1 | 3/2015 | Rossmark et al. | |

FOREIGN PATENT DOCUMENTS

| | | |
|---|---|---|
| JP | 2004234610 A | 8/2004 |
| WO | 2004/059420 A2 | 7/2004 |

OTHER PUBLICATIONS

Mar. 19, 2013—(US) Office Action—U.S. Appl. No. 13/517,878.
Sherman, A.J., Franchising & Licensing: Two Powerful Ways to Grow Your Business in Any Economy, 3rd Edition, AMACOM, 2004, 10 pp.
Http://www.batchgeocode.com/, pp. 1-4, Apr. 7, 2008, Map Multiple Locations/Find Address Coordinates, @ 2007 Phillip Homstrand.
Http://map-suite-geocode-usa.thinkgeo-llc.qarchive.org/, pp. 1-2, Apr. 7, 2008, Map Suite Geocode USA 1.0.
Http://www.fema.gov/plan/prevent/fhm/dl_mhip.shtm, pp. 1-5, Apr. 7, 2008, Multi-Year Flood Hazard Identification Plan (MHIP).

(56) References Cited

OTHER PUBLICATIONS

Http://www.navteq.com/about/database_about.html, p. 1, Apr. 7, 2008, Our Flagship Offering, @ 2008 NAVTEQ.
Http://www.geocode.com, pp. 1-2, Apr. 7, 2008, Tele Atlas Geocoding Services, @ 2008 Tele Atlas.
Http:/web.archive.org/web/20051018080503/www.point-x.com/solutions.htm, Solutions Overview, p. 1, Apr. 7, 2008, @ 2005 Point-X Corporation.
Http://www.point-x.com/AboutPointX.htm, About Point-X, p. 1, Apr. 7, 2008, @ 2001, Point-X, 6 Loch Lomond Drive, San Rafael.
Http:/web.archive.org/web/20051018081137/www.point-x.com/clients.htm, Clients, pp. 1-2, Apr. 7, 2008, @ 2005, Point-X Corporation.
Http://web.archive.org/web/20051219103214/www.point-x.com/managementteam.htm, Management Team, pp. 1-2, Apr. 7, 2008, @ 2005, Point-X Corporation.
Http://web.archive.org/web/20051018080524/www.point-x.com/aboutpointx.htm, About Point-X, p. 1, Apr. 7, 2008, @ 2005, Point-X Corporation.
Parry, Chris, "Reducing Locations, Maximizing Profit", pp. 1-2.
Http://developer.yahoo.com/maps/rest/V1/geocode.html, pp. 1-3, Apr. 7, 2008, Yahoo! Developer Network, @ 2008 Yahoo! Inc.
Jan. 5, 2015—(US) Non-Final Office Action—U.S. Appl. No. 14/341,276.
Mar. 14, 2014—(US) Office Action—U.S. Appl. No. 13/184,173.
May 15, 2013—(CA) Office Action—App. 2,561,195.
May 28, 2013—(CA) Office Action—App. 2,561,198.
Oct. 21, 2013—(US) Office Action—U.S. Appl. No. 13/184,173.
Apr. 22, 2013—(US) Office Action—U.S. Appl. No. 13/184,173.
Aug. 14, 2012—(US) Office Action—U.S. Appl. No. 13/184,173.
Aug. 30, 2012—(US) Office Action—U.S. Appl. No. 13/517,878.
Jan. 16, 2012—(CA) Office Action—App 2,561,198.
Oct. 31, 2011—(CA) Office Action—App 2,561,195.
Mar. 14, 2011—(US) Office Action—U.S. Appl. No. 11/461,512.
Jul. 12, 2013—(US) Office Action—U.S. Appl. No. 11/461,512.
Aug. 30, 2012—(US) Office Action—U.S. Appl. No. 11/461,512.
Jan. 29, 2013—(US) Office Action—U.S. Appl. No. 11/461,512.
Jul. 7, 2014—(US) Office Action—U.S. Appl. No. 13/184,173.
Jul. 9, 2014 (CA) Office Action—App 2,561,195.
Jul. 14, 2014—(CA) Office Action—App 2,561,198.
Feb. 6, 2012—(US) Final Office Action—U.S. Appl. No. 11/461,512.
Oct. 3, 2012—(US) Office Action—U.S. Appl. No. 13/517,878.
Sep. 6, 2011—(US) Office Action—U.S. Appl. No. 11/461,512.
May 5, 2011—(US) Office Action—U.S. Appl. No. 12/141,746.
Dec. 5, 2012—(US) Office Action—U.S. Appl. No. 13/184,173.
Sep. 26, 2011—(US) Non-Final Office Action—U.S. Appl. No. 12/141,746.
May 20, 2015—(US) Non-Final Office Action—U.S. Appl. No. 14/558,375.
Jul. 20, 2015—(US) Final Office Action—U.S. Appl. No. 14/341,276.
Final Office Action dated Mar. 2, 2015 in U.S. Appl. No. 13/184,173.
Nov. 10, 2015—(US) Non Final Rejection—U.S. Appl. No. 14/341,276.
Dec. 18, 2015—(US) Non Final Rejection—U.S. Appl. No. 14/558,375.
Feb. 4, 2016—(US) Non Final Office Action—U.S. Appl. No. 13/184,173.
Mar. 11, 2016—(US) Final Office Action—U.S. Appl. No. 14/341,276.
Apr. 5, 2016—(US) Final Office Action—U.S. Appl. No. 14/558,375.
Jun. 16, 2016—(US) Office Action—U.S. Appl. No. 14/341,276.
Jun. 15, 2016—(US) Notice of Allowance—U.S. Appl. No. 13/184,173.
Jul. 22, 2016—(CA) Office Action—App 2,561,198.
Jul. 11, 2016—(CA) Office Action—App 2,561,195.
Sep. 23, 2016—(US) Notice of Allowance—U.S. Appl. No. 14/341,276.
Dec. 2, 2016—(US) Notice of Allowance—U.S. Appl. No. 14/341,276.
Jun. 12, 2013—(US) Final Office Action—U.S. Appl. No. 13/517,878.
Http://point-x.com/, Point-X Location Intelligence, p. 1, Jun. 18, 2008, © 2001, Point-X 6 Loch Lomond Drive, San Raphael.
Http:/point-x.com/Overview.htm, Technology, p. 1, Apr. 7, 2008, © 2001 Point-X, 6 Loch Lomond Drive, San Rafael.
Jun. 19, 2017—Canadian Office Action—App 2,561,198.
Jun. 21, 2017—Canadian Office Action—App 2,561,195.
Sep. 25, 2017—(US) Non-Final Office Action—U.S. Appl. No. 14/558,375.
Oct. 6, 2017—(US) Non-Final Office Action—U.S. Appl. No. 15/441,503.
May 1, 2018—(US) Final Office Action—U.S. Appl. No. 15/441,503.
May 17, 2018 (US) Final Office Action—U.S. Appl. No. 14/558,375.
Jun. 20, 2018—(CA) Final Action—App 2,561,198.
Jun. 21, 2018—(CA) Final Action—App 2,561,195.
Sep. 7, 2018—(US) Non-Final Office Action—U.S. Appl. No. 15/441,503.
Oct. 4, 2018—(US) Non-Final Office Action—U.S. Appl. No. 14/558,375.
Nov. 23, 2018—(US) Notice of Allowance—U.S. Appl. No. 15/266,546.
Feb. 26, 2019—(US) Final Office Action—U.S. Appl. No. 15/441,503.
Jan. 14, 2021—(US) Notice of Allowance—U.S. Appl. No. 16/298,263.
May 7, 2021—(CA) Preliminary Review by PAB—App. No. 2561198.
Apr. 23, 2021—(CA) Preliminary Review by PAB—App. No. 2561195.
Jul. 9, 2014 (CA) Office Action—Application No. 2,561,195 (006591.00067), 5 Pages.
Final Office Action from U.S. Appl. No. 13/517,878, dated Oct. 3, 2012, 42 Pages.
Non-Final Office Action from U.S. Appl. No. 11/461,512 dated Jan. 29, 2013, 54 Pages.
Jul. 24, 2023—(CA) Office Action—App 3,122,877, 8 Pages.
Sep. 13, 2023—(US) Non-Final Office Action—U.S. Appl. No. 18/111,729, 31 Pages.

* cited by examiner

RETAIL LOCATION SERVICES

CROSS-REFERENCE TO RELATED APPLICATIONS

This application is a continuation of U.S. application Ser. No. 16/298,263, filed Mar. 11, 2019, now allowed, which is a continuation of U.S. application Ser. No. 15/266,546, filed Sep. 15, 2016, now U.S. Pat. No. 10,255,640, which is a continuation of U.S. Pat. No. 13,184,173, filed Jul. 15, 2011, now U.S. Pat. No. 9,483,767, which is a continuation of U.S. Pat. No. 11,488,356 filed Jul. 18, 2006, now U.S. Pat. No. 8,041,648, which claims priority to provisional application Ser. No. 60/773,946, filed Feb. 16, 2006, and also claims priority to provisional application Ser. No. 60/743,295, filed Feb. 15, 2006, all of which are incorporated by reference in their entirety.

FIELD OF THE INVENTION

The present invention relates to the field of site development, more particularly to the field of retail location development in the insurance industry.

DESCRIPTION OF RELATED ART

The use of a retail location in the insurance industry is known. Typically the retail location will include a phone and one or more individual offices. While the use of retail locations is known, problems exist for companies attempting to expand into new areas. Often a company may require that a retail location have a certain look or design, which requires a floor plan large enough to accommodate the requirements. However, it may not be preferable to build a new building to house the retail location. This is especially true if the retail location is relatively small or if there is a limited amount of available space to construct new buildings. Therefore, retail locations are often placed in existing buildings, which often must be modified or built out before it is suitable for use. For example, but without limitation, a retail location may be in a business park configured and directed toward providing office space for professionals. Another non-limiting example of where a retail location may be found is a standalone building which may be partially or completely zoned for commercial use. As can be appreciated, these retail locations may be adjacent to the retail locations of other business. Frequently, the retail location may be leased.

When a company is attempting to expand into a new area or add additional retail locations to provide greater coverage of an existing area, often there may not be anyone with knowledge of the local real estate market within the company who is available to work on finding and building out the retail location. Furthermore, if the new retail location is an expanded location (e.g. adds to the capacity or number of offices of the company), there will not be an existing individual to run the office.

In some circumstances, insurance retail locations are run by agency principals. The agency principal may be responsible for the retail location, for offering insurance products, for generating a portfolio of business and for insuring the retail location provides the required level of service in accordance with company guidelines. However, the use of agency principals can create problems during the start-up of a new retail location. For example, opening a new insurance retail location with a new agency principal for the purpose of offering insurance requires both an appropriately designed retail location along with an agency principal having the appropriate qualifications so that the individual can offer insurance with sufficient expertise to meet or exceed company policies and procedures. If the agency principal is new, training may be required and the agency principal may find if difficult to participate in the preparation of the new retail location. Current methods of preparing an operative retail location therefore tend to create undesirable delays or require the company to be more involved in the real estate market than is desirable. Thus, a method of improving the ability of a company to expand into new markets is needed.

BRIEF SUMMARY OF THE INVENTION

The following represents a simplified summary of some embodiments of the invention in order to provide a basic understanding of various aspects of the invention. This summary is not an extensive overview of the invention nor is it intended to identify key or critical elements of the invention or to delineate the scope of the invention. Its sole purpose is to present some embodiments of the invention in simplified form as a prelude to the more detailed description that is presented thereafter.

Aspects of the present invention are directed toward methods of preparing an operative retail location. In an embodiment, a geographical area is determined for placing a new retail location. The preparation of the retail location is monitored in a first development track while preparation of an agency principal is monitored in a second development track. In an embodiment, both tracks begin after the geographical area is determined and both development tracks conclude at substantially the same time.

Certain aspects of the present invention can be partially or wholly implemented with a computer-readable medium, for example, by storing computer-executable instructions or modules, or by utilizing computer-readable data structures.

As can be appreciated, the methods and systems of the above-referenced embodiments also may include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Exemplary Operating Environment

Figure 1:
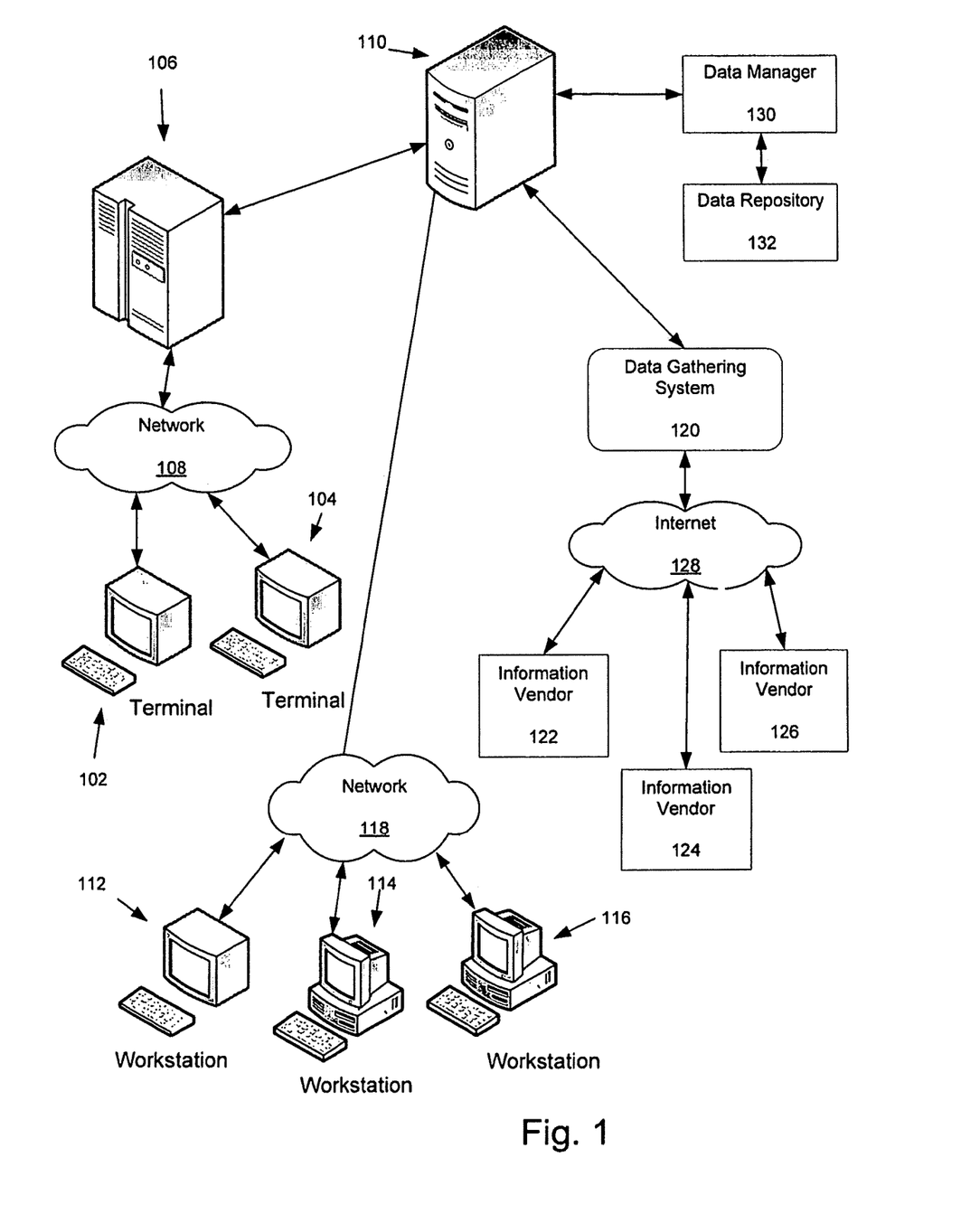
FIG. 1 illustrates a diagram of a computer system that may be used to implement aspects of the present invention.

FIG. 1 shows a diagram of a computer system that may be used to implement aspects of the invention. A plurality of terminals, such as terminals 102 and 104, may be coupled to an agency computer 106, via a network 108. In an embodiment, the terminal 102 may be located in a potential agency principal's home or wherever the individual is located. The agency computer 106 may be coupled to a data solutions transaction manager computer 110, which is described in detail below. The agency computer 106 provides potential agency principals with a user interface on terminals 102 and 104 for displaying policy information and decisions, and enables the potential agency principals to interact with data solutions transaction manager computer 110. Alternatively, the agency computer 106 may be omitted and the terminals 102, 104 may connect directly to the computer 110. In an embodiment this connection may be through a virtual private network in a known manner.

Optional workstations, such as workstations 112, 114 and 116 may also be coupled to data solutions transaction manager computer 110 via a network 118. In some embodiments of the invention, automated processes may be used in place of risk evaluation workstations. In alternative embodiments, the workstations 112, 114 and 116 may be general purpose computers not limited to risk evaluation. Workstations 112, 114 and 116 and terminals 102 and 104 may require information from external data sources to evaluate a potential insured party. In addition, one or more of the terminals and/or the workstations may be used to query third parties to obtain information regarding the progress of projects. Requests for such information may be transmitted via data solutions transaction manager computer 110 to a data gathering system 120. Data gathering system 120 may include a processor, memory and other conventional computer components and may be programmed with computer-executable instructions to communicate with other computer devices. Data gathering system 120 may access external sources of information, such as information vendors 122, 124 and 126 via the Internet 128. Alternatively, the workstations and/or the terminals may access the information vendors 122, 124, 126 directly. Information vendors may include state agencies that provide motor vehicle records for the citizens of that state, vendors that provide credit reports, vendors that provide actuarial data and vendors that provide other data that may be used to evaluate insurance risks. Information vendors may also include real estate vendors, real estate brokers, contractors, and video camera feeds provided from on-site locations. As can be appreciated, the method of contacting and providing information may vary depending on the need for security and confidentiality and to account for regulatory requirements.

Data solutions transaction manager 110 may be programmed with computer-executable instructions to receive requests for data from work stations 112, 114 and 116 and terminals 102 and 104, format the requests and transmit the requests to data gathering system 120. In one embodiment of the invention, requests for data are in the form of documents that are in extensible markup language (XML) format, however any other format may also be used. Data solutions transaction manager 110 may also be coupled to a data manager computer device 130 that can access customer data or other data stored in a data repository 132. In an embodiment, all data gathered on a site or a set of potential sites is stored in data repository 132 so that when additional requests are made for the same data, the data may quickly be obtained without requesting it from information vendors 122, 124 and 126. Data repository 132 may be implemented with a group of networked server computers or other storage devices.

Agency computer 106, if included, may provide insurance agents with a user interface on terminals 102 and 104 for displaying policy information and decisions, and may enable the potential agency principal to interact with data solutions transaction manager 110. The user interface may also allow an insurance agent to perform a variety of functions, such as entering customer data into prequalification policy templates, updating existing policy files, displaying decision results, entering customer data requests and changes to policy data, and ordering any available data for a particular customer from participating information vendors.

In an embodiment, potential agency principals may also access information without the use of terminals 102 and 104. For example, a potential agency principal may use a computing device, which may be a portable hand held computer such as but not limited to, a PDA or smart phone or the like that is connected to agency computer 106 and/or data solutions transaction manager 110 via the Internet or some other wide area network. The potential agency principal's computing device may use a user interface that allows the potential agency principal to perform some or all of the same functions described with respect to terminals 102 and 104.

One or more of the computer devices and terminals shown in FIG. 1 may include a variety of interface units and drives for reading and writing data or files. One skilled in the art will appreciate that networks 108, 118 and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

Exemplary Embodiments

In the detailed description that follows, various steps of methods are disclosed. It is noted that the disclosed methods are exemplary and that the order of these steps may be varied and that one or more of the disclosed steps may be omitted if not needed and that additional steps may be added.

In one aspect of the invention, an operative retail location is developed. The operative retail location involves a physical retail location and an agency principal. A retail location can be a space that allows for customer interactions and the conduct of business. A retail location may include one or more welcome/reception areas, transaction areas such as conference rooms, private offices, staff workstations, secured and locked file storage, play areas for children and transitional zones to move from one area to another. In addition, communication devices such as phones, computers, wireless devices and other communication devices and other features found in offices or retail establishments may also be included. The retail link may include a link, which may be intermittent and may be encrypted or otherwise secured, with the company database.

An agency principal may be an independent contractor of a company such as an insurance company. The agency principal may have some or all of the responsibility for developing, maintaining and running a business, such as an insurance agency business. The agency principal may be the main individual responsible for the operation of a particular retail location. The agency principal, in some embodiments, may be responsible for assuring that customers are provided with high-quality, professional treatment and may be the main person responsible for developing additional business.

In some aspects of the invention, a retail location may need to be created or further developed and an agency principal may need to be prepared. In an embodiment of the invention, the process of developing a retail location and the process for preparing an agency principal follow parallel tracks. One track involves the build-out or development of the retail location. The other track involves the preparation of the agency principal. In some embodiments, the track concerning the build-out of the retail location is designed to be completed substantially simultaneously with the training of the agency principal. Substantially simultaneously does not require that two events occur simultaneously. Substantially simultaneously means that two events are completed in close time proximity to each other relative to the amount of time for the event to be completed. Events that occur substantially simultaneously include events that occur within 15% of the total time required for an event to be completed. Thus, if the development of a retail location takes place in thirty days, an event that is completed within four and a half days (i.e. 15% of thirty days) of the completion of the development of the retail location would be said to have been completed substantially simultaneously with the completion of the development of the retail location. In other embodiments, the track concerning the build-out of the retail location is completed before or after the training of the agency principal. Moreover, more than one agency principal can be involved with a particular retail location.

In some embodiments, developing the retail location requires determining the site for the retail location. Numerous factors can be evaluated in determining the appropriateness of a site. These factors may include, but are not limited to: accessibility, visibility, availability of parking, ease of finding the site, proximity to readily discernable landmarks, proximity to other desirable retail establishments, distance from non-desirable retail establishments, cost, and attractiveness of the setting. Each of these factors can be given a weight related to the relative importance of the factor. An analysis can be performed on the factors and their relative weights by a computer, processor or otherwise. Based on this analysis, potentially suitable sites can be placed into classes of suitability and ranked. Among these potentially suitable sites, a particular site can be selected. It should be noted that a location with a particular factor that is especially exceptional may be chosen even though the average value of all the factors for that site is not greater than some other competing site. Thus, a site with the highest average score may not be always be selected. Additional details regarding the selection of retail locations is found in U.S. provisional Ser. No. 60/743,295, filed Feb. 15, 2006, which is incorporated by reference in its entirety herein.

Developing the retail location may also require a build out. A build out may include constructing a new building or office. A build out also may require renovating an existing building or office. The build out may involve the creation or renovation of reception areas, offices, wiring, divided spaces, displays, conference rooms, storage areas, signage, low voltage wiring for computer and telephone hook-up, built in reception desk/workstation, computer facilities, network and Internet infrastructure, communication structure facilities and wireless communication structures.

In an embodiment, development of the retail location also may include linking the retail location to a company database. The company database can be managed or operated by a central organization (e.g., the company) which may have numerous retail locations. In some embodiments, the company may be an insurance company and the retail location may offer products or services provided through or by the insurance company. The retail location may offer products or services of only one company. The retail location also may offer products and services provided by more than one company. The company database may be a central database which stores information regarding products, services, customers, retail locations, industry data or other information. The company database may also include agency office site characteristics such as type of commercial property, size of the office, office layout, office features, and type of neighboring businesses. The link between the retail location and the company database may be a hard wired connection, may exist through an Internet linking and may exist through a dedicated wired or wireless connection (that may be direct or indirect).

In an aspect of the invention a relationship is created or is further developed between an agency principal and a company. In an embodiment, the company is an insurance company and the agency principal is an insurance agent of the insurance company. The agency principal may manage the retail location, which may include interaction with customers and the company, providing products and services to assist customers, hiring and training of staff and assistants and additional management functions.

The agency principal may need to be prepared. This preparation may include education and training regarding industry and company standards and procedures, products and services, rules and regulations and business operations. This preparation in some embodiments may be conducted by or at the company, remotely by the individual, by a third-party or in other manners. Preparation may include, in some embodiments, shadowing of an existing agency principal or training by an existing agency principal at a separate retail location.

In an aspect of the invention, the potential agency principal must pass a screening process. This screening process may include analyzing the educational and vocational background of the potential agency principal, analyzing the potential agency principal's history regarding any infractions or violations of rules or statutes, and testing the agency principal regarding products and services as well as general and specific aptitudes. The potential agency principal also may be required to meet minimum qualifications. These minimum qualifications may include that the potential agency principal obtain the required licenses or permits necessary to offer products or services in the particular jurisdiction of the retail location, obtain satisfactory results regarding industry, product, service, aptitude or overall testing or analysis, or additional qualifications. In an aspect of the invention, the company, the potential agency principal or a third-party may determine whether the agency principal is ready to manage a retail location. This determination may include determining whether the agency principal has passed the required aspects of a screening process and whether the agency principal has met the minimum qualifications required to function effectively as an agency principal.

In an aspect of the invention, the development of the retail location and the preparation of the agency principal may begin substantially simultaneously. In another aspect of the invention, the development of the retail location and the preparation of the agency principal may be completed substantially simultaneously. In another aspect of the invention, the development of the retail location and the preparation of the agency principal may begin and be completed substantially simultaneously. In another aspect of the invention, the development of the retail location and the preparation of the agency principal are not begun or completed substantially simultaneously.

Figure 2:
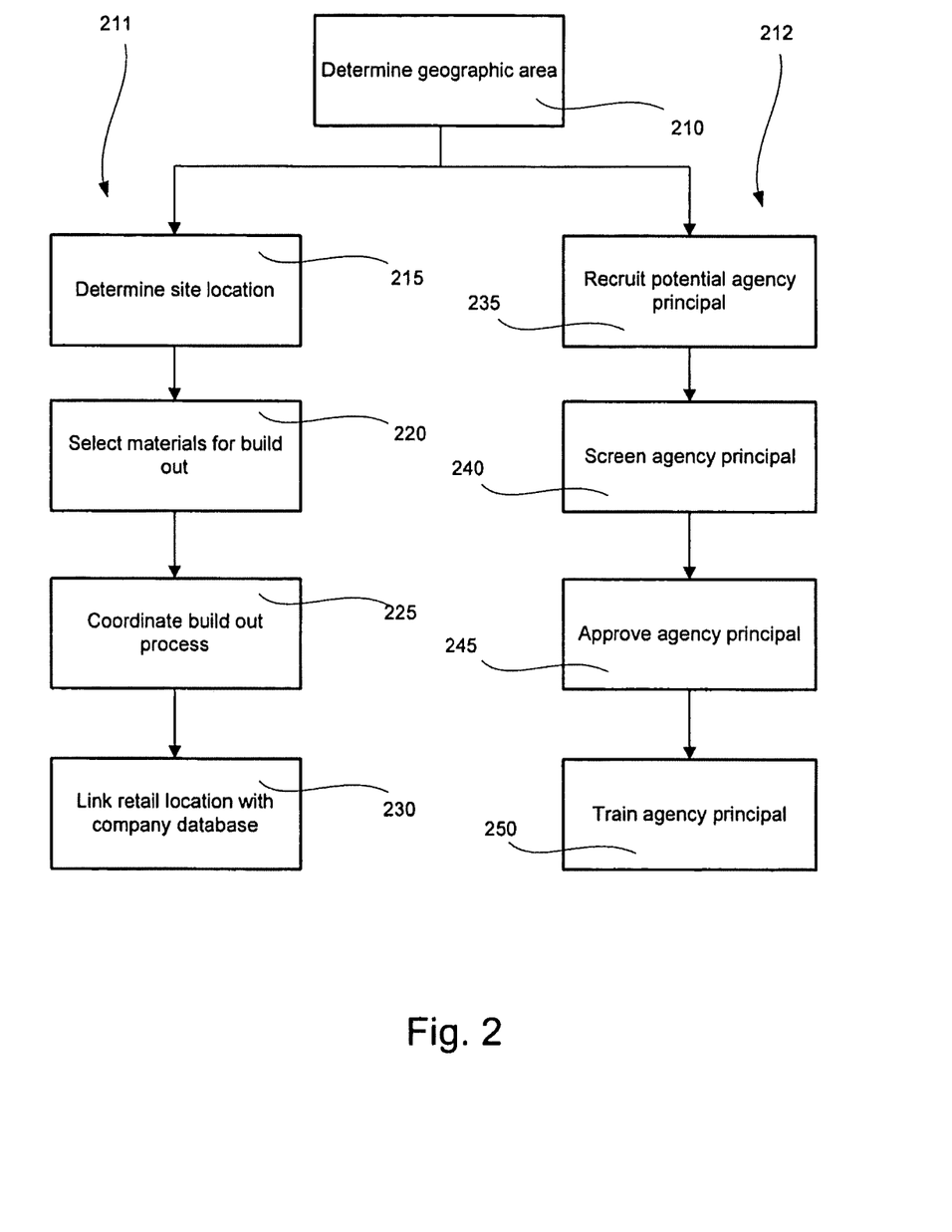
FIG. 2 illustrates a method of adding an operative retail location in accordance with an aspect of the present invention.

Turning now to FIG. 2, an embodiment of a method of preparing an operative retail location is depicted. First in step 210 a geographic area is chosen. More will be said about this step with respect to FIG. 3; however, depending on the desired scale the geographic area and the ability to determine various factors, the geographical area may be a county, a city, a zip code, a neighborhood, a city block or even a particular location on a city block.

After the geographical area is chosen, an individual may be recruited and the precise placement of the retail location may be ascertained. As can be appreciated, it can be useful to synchronize the training of an agency principal with the preparation of a retail location. Therefore, track 211 and track 212 may be performed substantially simultaneously after the geographic area is decided.

As aspects of the present invention are directed toward completing track 211 and 212 substantially simultaneously, planning the development of the retail location so that both tracks 211, 212 are completed substantially simultaneously is helpful. In an embodiment, the end result for each track can be determined (such as a trained and licensed agent principal and a finished retail location). The prerequisites for the final step to obtain the desired results can be determined. Then, the prerequisites for the prerequisites of the final step can be determined. By repeating this process and going backward through the development process and determining the prerequisite steps for each subsequent step, the needed steps for each track can be determined. Information provided from various information vendors 122, 124, 126 (FIG. 1) can be used to help determine the needed steps and the approximate time needed to complete each step. From this information, a project chart can be generated that lists each step in a chronological fashion so that it is apparent which steps need to be completed before other steps are started. In an embodiment, the project chart may be a Gant chart. The project chart may be displayed on one of the workstations or agent terminals (as shown in FIG. 1) in response to a request and may be stored in data repository 132. In addition, updates may be provided so that the current status of the project is apparent upon viewing a display depicting the project chart.

Available input can be used in configuring the project chart and the generation of the project chart may automatically incorporate limitations on personal availability. Availability of particular resources such as information technology personnel may be used to determine when a particular retail location can be linked up with the company and made operational. Furthermore, reviews and approval of certain steps may be synchronized with the availability of needed individuals so that neither track is unnecessarily delayed waiting for approval of a particular step.

Looking now at track 211, in step 215 the site of the retail location is chosen. This site may be selected from one of two or more possible sites that met a minimum set of demographic criteria. For example, a site in a business district may be desirable while a site in an industrial area may be unacceptable. The data for selecting the site may be provided over a network such as described in FIG. 1 between an information vendor 122 and a risk evaluator workstation 112 and local real estate agents can be utilized to provide much of the data. Furthermore, if two or more sites are available then the preferred site may be determined by generating a site score for each site. In an embodiment, variables relating to known factors that make a location desirable can be evaluated to determine a value for each variable. The variables may be assigned weights depending on their relative importance. Sample variables include, but are not limited to, accessibility, visibility, availability of parking, ease of finding the site, proximity to readily discernable landmarks, proximity to other desirable retail establishments, distance from non-desirable retail establishments, cost, attractiveness of the building and attractiveness of the surroundings. Other factors may also be considered and values may be assigned to variables representing these factors. In addition, variables such as those representing the accessibility and availability of parking may be given greater weight than proximity to discernable landmarks or the attractiveness of the building.

Once the values are determined, a site score may be calculated based on these values. One of the simplest ways to generate the site score is to simply sum up the values, taking into account any weights given to particular variables. Other methods may include additional computational steps such as dividing the score by the variance or other methods that are determined to be appropriate. Additional methods of generating a total value based on the value of a set of inputs are only limited by the creativity of the individual.

To provide details and information potentially useful in generating the site score, information vendors may provide information regarding each location. The information may include, but is not limited to, pictures of the building in which the potential retail location is located, one or more views of the surroundings, an overhead view showing streets and parking layout, a view from the potential retail site, and other useful pieces of information including cost estimates for tenant improvements (which may be provided by a real estate agent/broker), the current zoning status, rental costs, and square footage available.

Part of the site selection may involve obtaining a lease for the site. The negotiation of the lease, which may take place over a network such as disclosed in FIG. 1, may include a request for certain provisions such as a termination clause to allow early termination of the lease, a renewal option to extend the lease, an abandonment clause to allow for an empty site for a period of time, a right to refuse a landlord's request to relocate, the allocation of repair costs or limits on repair costs for items such as the HVAC system, and the lease period being less than 5 years.

Next in step 220, the build out materials are selected. This may include the selection of materials such as those used in the construction of any necessary walls with the understanding that walls should be configured so as to provide the needed privacy where appropriate. In an embodiment this may include the selection of office furniture and the layout of the office along with any improvements needed to make the office space functional and in keeping with company policies. Depending on company policies, retail locations may be developed in accordance with a standard design that is expected to be used for all retail locations, and if so, the furniture and the layout should match the standard design while taking into account any regional difference that suggest a modification of the standard design. In an alternative embodiment, two or more standard designs may be available so that the potential agency principal can choose the style that bests fits the individual's personality. The selection may be done over a network and may incorporate the exterior view of the retail location so that a more tailored retail location is provided. In accordance with certain aspects of the present invention, the design may include a reception area, a conference room and one or more offices to allow for the assistance of customers and clients.

In step 225 the build out process can be coordinated. In an embodiment, a portion of the coordination may be outsourced by using a build out manager. In an alternative embodiment, the potential agency principal may ensure the build out takes place in a desired manner. In an embodiment, at least a portion of the coordination may take place over a network so as to avoid the need for constant on-site supervision. For example, the third party may negotiate the lease, may hire and coordinate any improvements to the retail location, and may coordinate furniture and office equipment delivery and installation, among other tasks. It should be noted that if a third party is commissioned with handling most of the retail location development details, it will be less likely that either an employee of the company or the potential agency principal will need to personally visit the site. However, both the company and the potential agency principal may want to visually inspect the build out process periodically to verify the build out is to expected standards. Furthermore, progress reports can be provided so that potential issues with timing can be determined before it is too late to take remedial action to avoid potential delays. In an embodiment, visual inspections may be done with video equipment that may be configured to accept remote controls and provide a video feed to a remote viewer.

As can be appreciated, the report process may be automated so that, prior to a milestone, a check on the progress can be provided. The report can include a confidence level regarding the expectation of meeting the milestone deadline. Multiple issues with meeting milestone deadlines may provide an indication that the final deadline is less likely to be met and can be used to provide an indication to the company and the individual preparing to become an agency principal of possible delays.

In step 230, the retail location is linked to the company database in accordance with an embodiment of the present invention. As can be appreciated, it is useful to have any computers that are intended to be used for this link installed prior to establishing the link. Thus, it is helpful to have the build out of the retail location substantially complete before beginning step 230. The linking may include the loading of software onto one or more devices. Alternatively, it may involve the installation of one or more pieces of hardware. It should be noted that the link may be intermittent. To provide security, in an embodiment the link may be provided over dedicated communication line. In an alternative embodiment, the link may be provided over a shared wide area network, such as the Internet, through a VPN or other encrypted means typically used for connecting remote sites together so that they can share confidential information over an otherwise unsecured network. In an embodiment, the link can allow the agency principal in the retail location to have access to company information so that the agency principal can effectively offer customers insurance solutions.

As depicted, the steps in track 212 are being performed concurrently with the steps in track 211. It should be noted, however, that various steps may have different start and end times and the depicted method is merely representative of a two track method of preparing an operative retail location. Thus, for example, step 235 might start at about the same time as step 215 but might end well before step 215 ends.

In step 235 a potential agency principal is recruited or identified. In an embodiment, this may involve automatically selecting individuals with predetermined qualifications from individuals that have applied for a related position using the company's recruiting website. In an alternative embodiment, a set of individuals may be provided so as to facilitate an interview process. Once an individual is selected and it is determined that the individual desires to work in the geographic location, next in step 240 the individual is screened.

It should be noted that changes to company policy and varying regulatory requirements may cause the screening process to change, both over time and with respect to a locale. In an embodiment, the screening process may include, but is not limited to, items such as an aptitude test, a credit check and a determination that any necessary educational prerequisites are met. In an embodiment, one requirement of the screening process may be that the individual is above average on one or more aptitude tests. The screening process may allow a screening score to be developed so that a determination of whether the individual meets the minimum requirements can be made. In an embodiment, the results of the screening process, which may be performed, at least in part, by one or more information vendors 122, may be provided over the network. In an alternative embodiment, the screening score itself may be provided over the network. The total screening score, taking into account all the various checks, may be compared to determine whether the individual meets the minimum qualifications.

Once the screening processing is complete, the potential agency principal may be approved in step 245. As part of the approval process, a determination of whether the individual has or is likely to obtain the necessary licenses can be made. For example, certain states may require a producer's licenses. Generally speaking, each state has specific requirements that must be met in order for an individual to obtain the license(s) needed to offer insurance in that state. In addition, the potential agency principal may be required to obtain national licenses such as a series 6 NASD license in order to sell or even partner in the selling of certain financial products. It should be noted that a determination of whether an individual has the needed licenses may also be part of the screening process.

After the approval process is complete, in step 250 the agency principal is prepared. The training of the potential agency principal may be partially Internet based training, may be centralized training or may be some combination of the two. In an embodiment, the training may include real-time Internet based instruction. For example, online mentoring may occur via a live, real-time, networked system using video recorders configured for use over the network and may provide the ability for the potential agency principal to view systems used by other agents. Tests may be provided to verify that the agency principal comprehends the material. If the tests are multiple choice or true false tests, results may be provided to the potential agency principal over a network. An analysis of the test results may be used to determine areas of weakness or whether an individual would benefit from additional training in a particular area. In an embodiment, the potential agency principal may gain experience working with an existing agency principal. After it is determined that the individual sufficiently comprehends the material and is prepared to start, the individual may begin to work from the completed retail location.

Figure 4:
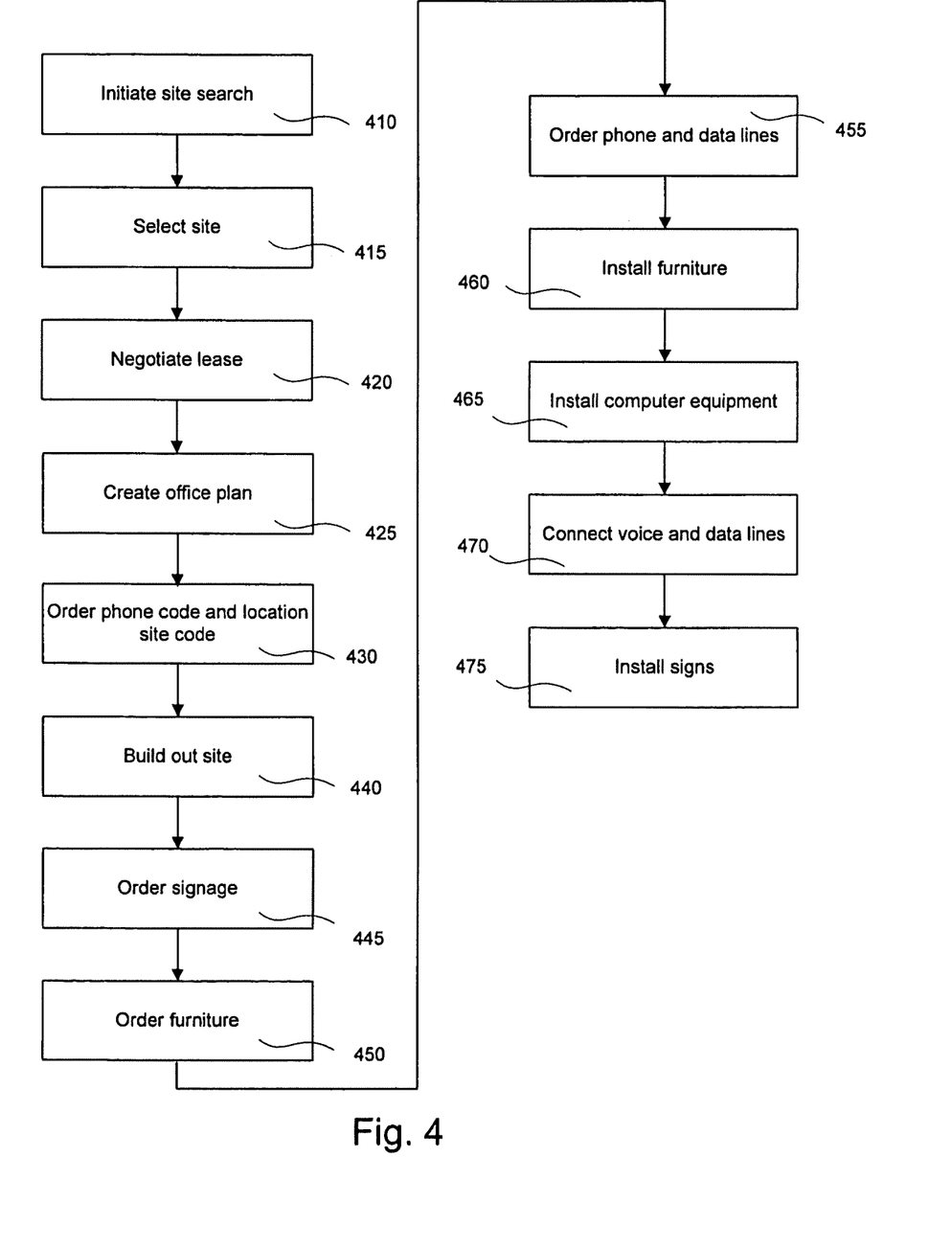
FIG. 4 illustrates a method of preparing a retail location in accordance with an aspect of the present invention.
Figure 5:
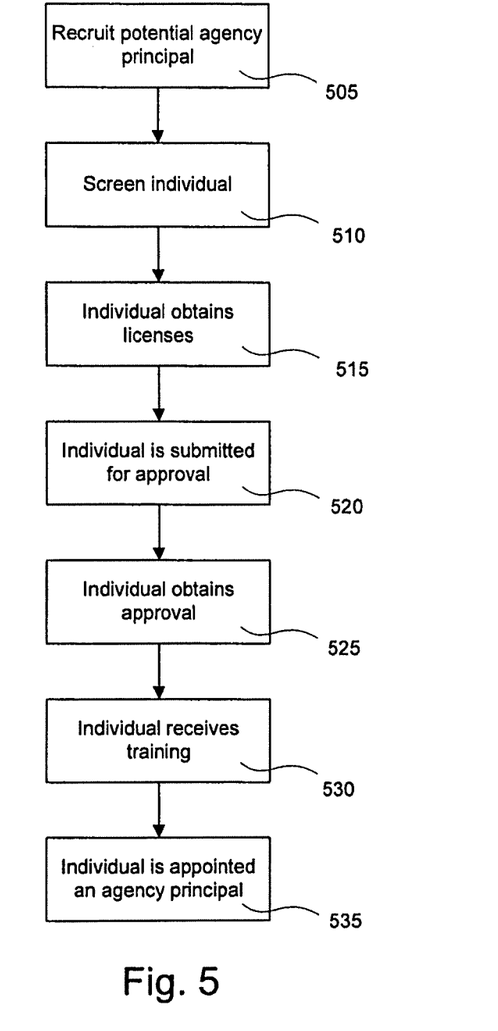
FIG. 5 illustrates a method of preparing an agency principal in accordance with an aspect of the present invention.

It should be noted that FIG. 2 represents just one embodiment of a two track process. FIGS. 4 and 5, which represent tracks 212 and 211, respectively, illustrate some of the additional steps that may be taken in the tracks 211, 212. Additional steps may be added as desired and depicted steps may be combined or omitted.

While additional details regarding timing of the two tracks will be provided below, in an embodiment the two tracks may be completed in less than 4 months. Such a rapid production of a retail location allows for greater market flexibility and responsiveness. In an alternative embodiment, the two tracks may be completed in less than three months so as to provide an even more rapid market deployment. However, in an alternative embodiment where there is less of a need to promptly deploy another retail location, the two tracks may be completed in about 8 months or longer. As can be appreciated, additional time may allow for more time to be spent on selecting the site and/or negotiating terms and conditions of potential leases with a number of sites so as to ensure the best value is obtained.

Figure 3:
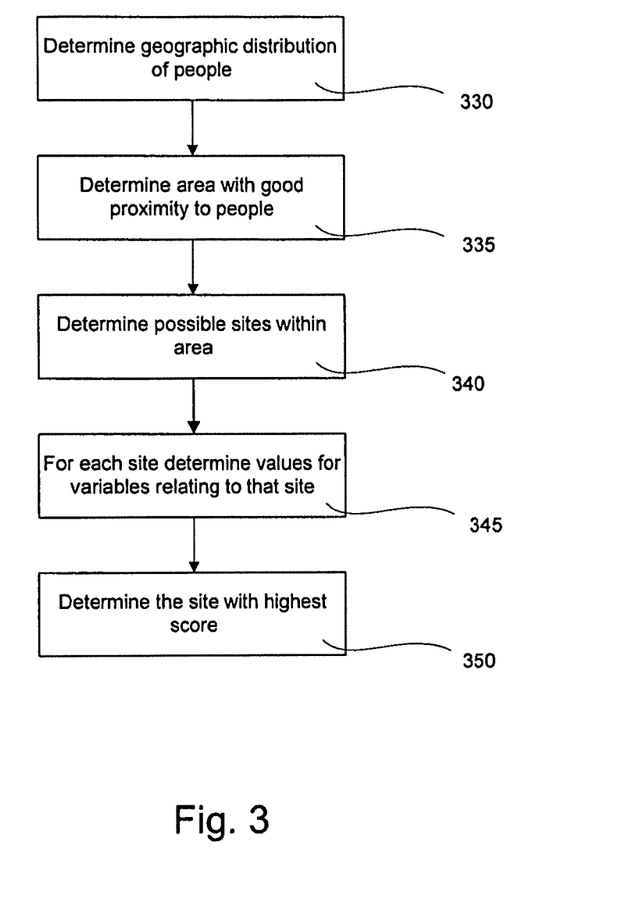
FIG. 3 illustrates a method of selecting a site for a retail location in accordance with an aspect of the present invention.

Turning to FIG. 3, an embodiment of a method of determining a site is illustrated. First, the geographical distribution of people in a general area that the company desires to expand into can be determined in step 330. The general area could be a large region such as the Midwest, a smaller region such as a state, or a smaller region such as a county, city, zip code or other area. In an embodiment, the geographical distribution may be provided from census data. Next, in step 335 a location of a geographical area is determined. The size of the geographical area may vary, depending on the accuracy of the algorithm and the amount of information about the region that is available and the location of the geographical area may be based in part on a determination of a location that is closest to the greatest number of people in the overall region. As can be appreciated, a smaller geographic area may be more useful in more densely populated areas. In an embodiment, the location of the geographic area could be determined by finding a first area where the mean distance between the first area and people within the region is at a minimum.

In an alternative embodiment, the location of other company retail locations may also be considered so that the determination of the geographic area is based on proximity to people having insufficient access to the company's services or an area expected to grow. For example, a first area could be a geographic area of interest if it has a location value that approaches a maximum. In an embodiment, the location value could equal a first value divided by a second value, where the first value equals the mean distance between multiple households in the region and an existing company retail location, and the second value equals the mean distance between the first area and the same multiple households in the region. Numerous other algorithms are possible for determining the location value and/or determining the geographic area of interest, depending on what factors are deemed important.

Next, in step 340, possible sites within the determined geographic area are reviewed to determine whether the sites meet a minimum level of qualifications. In an embodiment, sites next to less desirable types of other businesses, such as adult bookstores, may be determined to be incompatible, or at least inconsistent, with the targeted demographics or a company and/or brand image.

Then, if two or more sites are determined to be suitable sites based on surrounding environmental factors, values for certain variables may be determined in step 345. These variables may represent factors such as proximity to the center of town, ease of entering and exiting the site, mean travel time for people in the region, the availability of parking, proximity to a competitor, proximity to easily discernable landmarks, traffic patterns, cost of floor space, the attractiveness of the site, the attractiveness of surrounding buildings and any other factors that are determined to have a correlation with whether a retail location is successful. As is known, the relevant variables and coefficients for the variables may be determined via known statistical techniques such as regression. It should be noted that different regions may have different coefficients to account for regional and cultural differences.

Once the variables and coefficients for a particular region are determined, in step 350 a site score is determined for each site. This allows the preferred site to be determined based on the values provided for each variable. It should be noted that while a simple summing of values of the variables multiplied by the determined coefficients may be sufficient, additional steps such as dividing the score by the standard deviation of the values may provide an indication as to which site is the most consistent. Exponential weights for certain variables may also be useful for variables where a high value is particularly helpful in ensuring the retail location is successful. However, as noted above, the site with the highest value may not be selected.

FIGS. 4 and 5 provide an overview of the two tracks 211, 212. It should be noted that additional steps may be required for either track. For example, some districts and towns require individuals doing business within the district or town to obtain a permit before starting a new business. And as noted in FIG. 5, individuals may need to obtain licenses. If the individual is going to be working in the insurance industry, for example, typically the individual will need to obtain one or more state licenses in order to offer insurance. In general, track 211 relates to the preparation of the retail location and track 212 relates to the preparation of the individual. It also should be noted that while portions of the methods illustrated in FIGS. 4 and 5 require individuals to perform certain actions, each of the steps may be at least partially performed on a computer. For example, a notification that it is time to order the furniture may be provided so that the furniture is ordered in a timely fashion. Furthermore, the progress of each step may be maintained in a computer file so that that progress charts showing the current level of progress can be provided as needed.

Looking at FIG. 4, an embodiment of track 211 is disclosed. In the discussion that follows various time frames are given for the various steps. It should be noted that these steps may be done faster or slower depending on the desired overall time frame.

First a site search is initiated in step 410 that may take about two to five weeks and preferably will take about three weeks. A very short time period suggests a limited number of sites are available while a longer period will delay the overall process. The results of step 410 may be several sites, the details of which may be provided over the network (FIG. 1). Next in step 415, a site is selected and this may take about one to two weeks. Either currently or after step 415 is complete, a lease is negotiated in step 420 and this activity may take about two to six weeks, preferably about four weeks. Either currently or after step 415 is complete, an office plan is created in step 425. The office plan provides for using the available space in an efficient manner and may include, but is not limited to, the placement, movement or removal of walls along with a communication wiring plan that may show the placement of voice and/or data lines along with other low voltage wiring. In addition, after the site is selected, a phone number and location site code that is used to represent the retail location in the company database may be ordered in step 430 and this activity may take about one to two weeks.

Once the lease is negotiated and any required subleases are executed, build out of the retail location begins in step 440. The resultant retail location may resemble, for example, the retail locations depicted in FIG. 7 or FIG. 8 after about two to eight weeks, and in an embodiment the build out may take about six weeks.

At some point after the site search is initiated, the sign process begins in step 445. This may be a staged process that may include a first stage for obtaining appropriate sign permits, a second stage for designing the sign to fit the requirements of the city and a third stage for ordering the sign. The total time may be split into three two-week sessions. Generally speaking, however, the signage will not be ordered until the site is selected.

In step 450, furniture is ordered and the process may take about one to two weeks. In an embodiment the potential agency principal can order the furniture over a network by reviewing various design options and selecting the option that is most appropriate. As part of the furniture ordering process, office equipment such as phones, computers, printers, copiers and the like may be ordered. Next, in step 455 phone and data lines may be ordered. If the ordering of computers and the like is included in this step, it may take about two to five weeks.

In step 460 the furniture is installed and next in step 465 the computer equipment is installed. Both steps may take about one to two weeks. In step 470 the voice and data lines are connected/installed and the various equipment is connected to the network and this process that may take about one to two weeks. Finally in step 475 the sign(s) is/are installed in a process that may take about one to two weeks.

Turning to FIG. 5, first in step 505 a potential agency principal is recruited or selected from a list of applications, a process that may take one to four weeks. Next in step 510, the individual is screened to ensure the individual is both qualified and a good fit for the position over a period of one to three weeks. In step 515, the individual applies for the needed state licenses. As the application process depends on state requirements, the length of this process varies depending on the state and the individual's qualifications.

In step 520 the individual can be submitted for approval and in step 525 the individual obtains approval. The length of either process may vary and may be about a week. It should be noted that the approval may be contingent on the individual meeting other necessary qualifications.

In step 530 the individual can receive training. In an embodiment the training may take place in a central location and may take about four to nine weeks and preferably may take about seven weeks. This period may include one to three weeks of mentoring with an experienced agency principal. Finally, in step 535 the individual is appointed an agency principal. While numerous variations are possible, in an embodiment the preparation of an agency principal may take about 16 weeks from start to finish. It is noted that some delay may result if the training takes place at a central location on a periodic basis. However, the process may be shortened if the individual is familiar with the business of the company. Therefore, in an embodiment the preparation may range from about 8 to about 24 weeks.

An operating retail location may be sought so that consumers can obtain needed services and the agency principal can assist the customers. In an embodiment the two tracks 211, 212 may begin substantially simultaneously. In an alternative embodiment the two tracks 211, 212 may end substantially simultaneously. In another alternative embodiment, the two tracks 211, 212 may begin and end substantially simultaneously. As can be appreciated, simultaneous ending is perhaps more valuable but it is preferable that both tracks can begin and end substantially simultaneously so that any delay is minimized. Thus, if the track 212 takes about 16 weeks then it is advantageous that the track 211 finish substantially simultaneously so that an operational retail location can be quickly prepared.

It is noted that while various times to complete certain tasks have been disclosed, some of this time may involve coordinating the schedules of various individuals. If a calendar indicating the availability of each person that is scheduled to work on the establishment of the operation retail location is known, then it may be possible to schedule the tasks so that some of the delays are removed.

Figure 6:
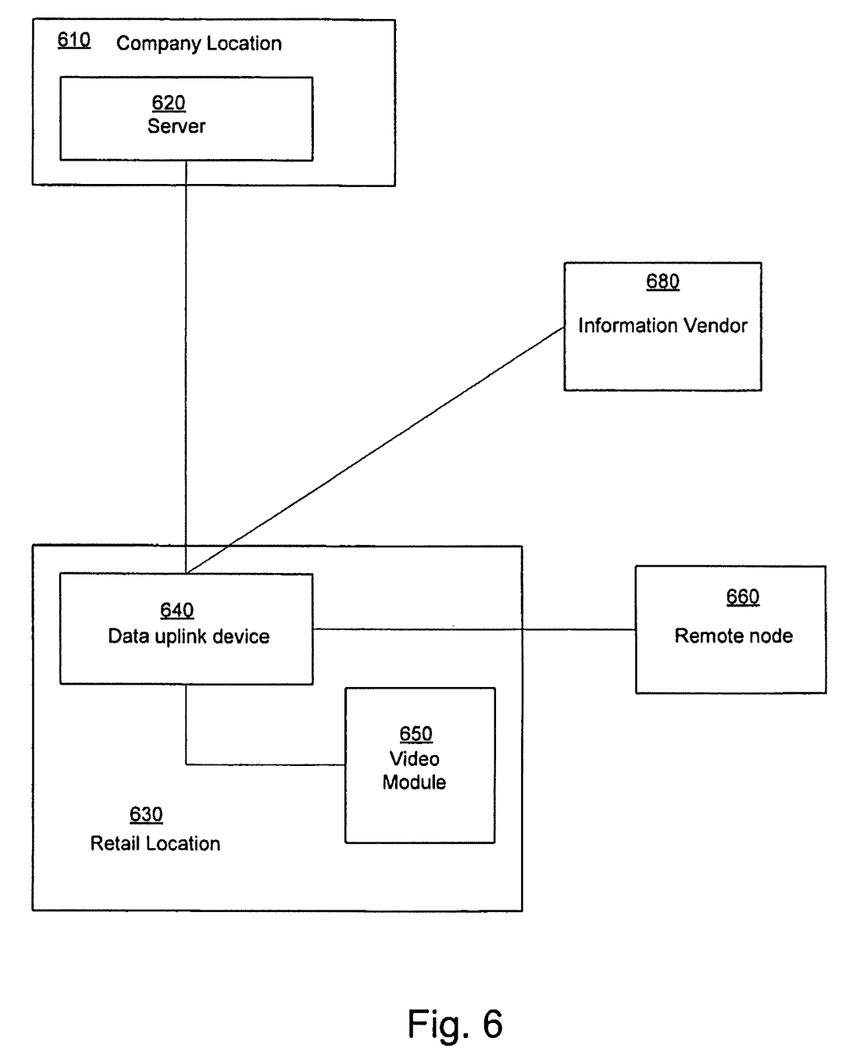
FIG. 6 illustrates a schematic of a system layout for use in preparing the operative retail location in accordance with an aspect of the present invention.

Looking now at FIG. 6, an embodiment of a system that may be used to enable aspects of the present invention is illustrated. It should be noted that components of the system depicted in FIG. 6 may be omitted or combined as appropriate. As depicted, a company location 610 may include a server 620. The server 620 may be connected to a data uplink device 640 positioned in a retail location 630. In an embodiment, the data uplink device 640 may be a computer connected to a network. In an embodiment, the data uplink device 640 may also include a link to an information vendor 680 that may allow the information vendor to access or control a video module 650. In an alternative embodiment, the data uplink device 640 may be a simple network connection. It should be noted that the depicted connections may be wireless. As illustrated, the data uplink device 640 is connected to the video module 650. In an embodiment the video module 650 may include one or more video cameras that allows for remote viewing of the retail location 630. The video module 650 may be protected by a security code so that only authorized individuals may use it.

As depicted, the data uplink device 640 is connected to a remote node 660. The remote node 660 may include a computer and/or a display that is configured to provide the pictures generated by the video module 650. As noted above, this may be directly accessed by the user or may be done through some intermediate steps such as logging onto a vendor web site or the like. In an embodiment, the images may be provided in substantially real time and the video module 650 may be configured to respond and vary the focus of the one or more webcams in response to input provided at the remote node 660 or the server 620. Thus, the video module 650 allows for remote inspection of the retail location 630.

As can be appreciated, the server 620 may be connected to a network so that the signals provided by the video module 650 may be distributed as needed. In an embodiment, the remote node may be omitted and individuals wishing to view the visual output of the video module 650 may access the server 620. In an embodiment, the server 620 may be omitted and the data uplink device 640 may be connected to a wide area network such as the Internet so that individuals, represented by the remote node 660, may access the video module 650 through the data uplink device 640 in a known manner, regardless of their location.

As can be appreciated, the provision of remote video inspection, an embodiment of which is illustrated in FIG. 6, allows an individual training in one part of the country to remain aware of developments happening in the retail location. This can help ensure that, as tasks are completed, the various parties are quickly able to determine the tasks were correctly completed so that the next task may begin. This also makes it much easier to, for example, provide training in a central area. In this manner, a simultaneous two track process for providing an operational retail location can successfully proceed to completion in a timely and cost effective manner.

Figure 7:
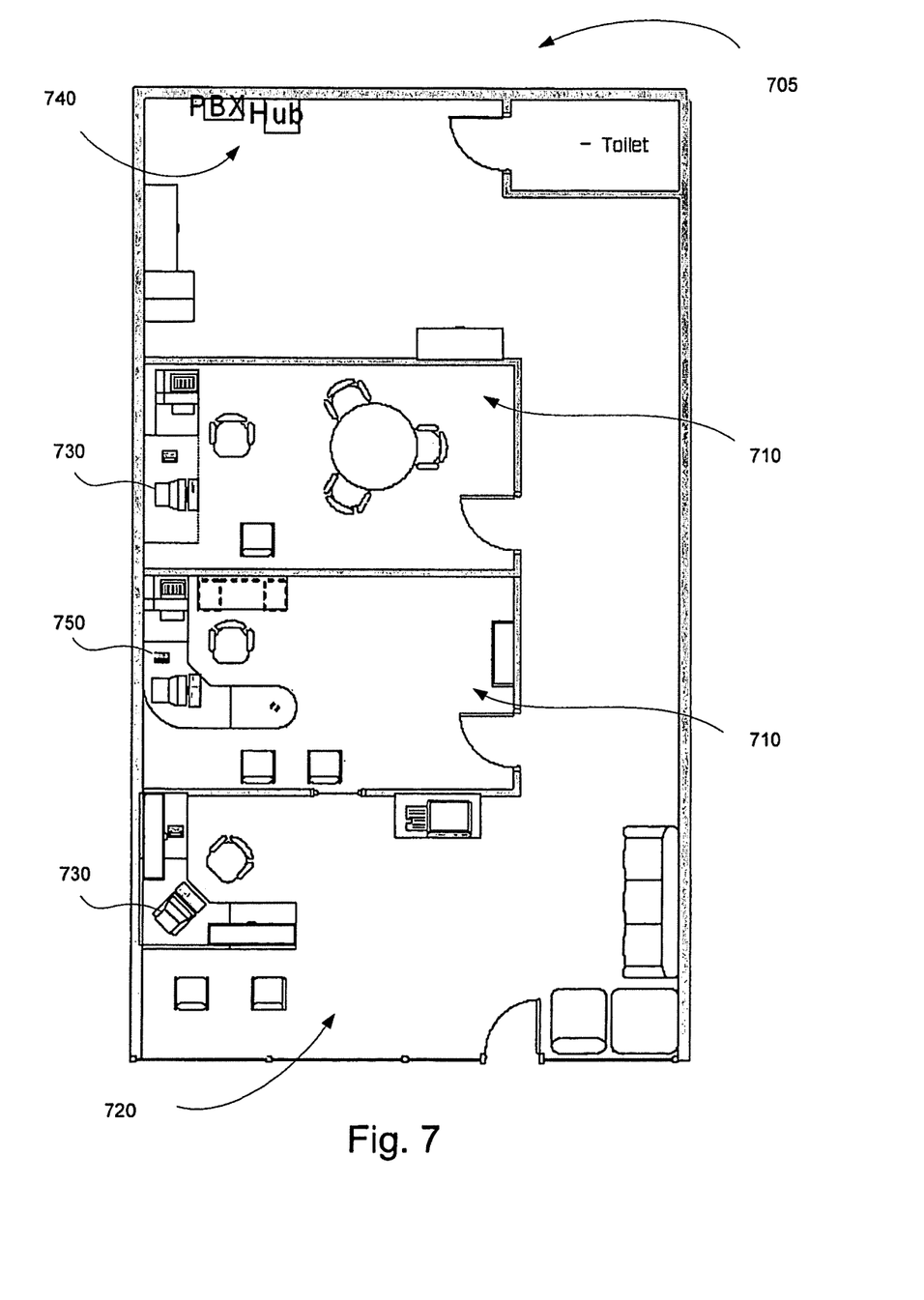
FIG. 7 illustrates an embodiment of a retail location in accordance with an aspect of the present invention.

Turning to FIG. 7, an embodiment of a retail location 705 is depicted. The retail location 705 includes offices 710 and a reception area 720. In addition, the retail location 705 will include office equipment, which may be office furniture, computers, printers and the like. For example, one or more computers 730 may be provided in appropriate locations. A network connection 740 may be provided to facilitate a telecommunication link and a data link with other locations. One or more phones 750 may be connected to the network connection 740. In an embodiment, the phones may be configured to provide audio signals via the data link and therefore a single data connection may be the only connection required for the retail location 705. As can be appreciated, decreasing the need for additional lines, whether they are data or voice lines, reduces the cost of running the retail location 705 and can save substantial money over a period of time. The one or more phones 750, which may be VOIP phones connected to a power over Ethernet hub, may include voice mail and other standard features. The retail location 705 may include a link such as shown in FIG. 6, which may be intermittent, to a company database such as the data repository 132 depicted in FIG. 1. In addition, the trend towards maximizing the use of space has led to the creation of partitions, which may be used as individual offices 710.

Figure 8:
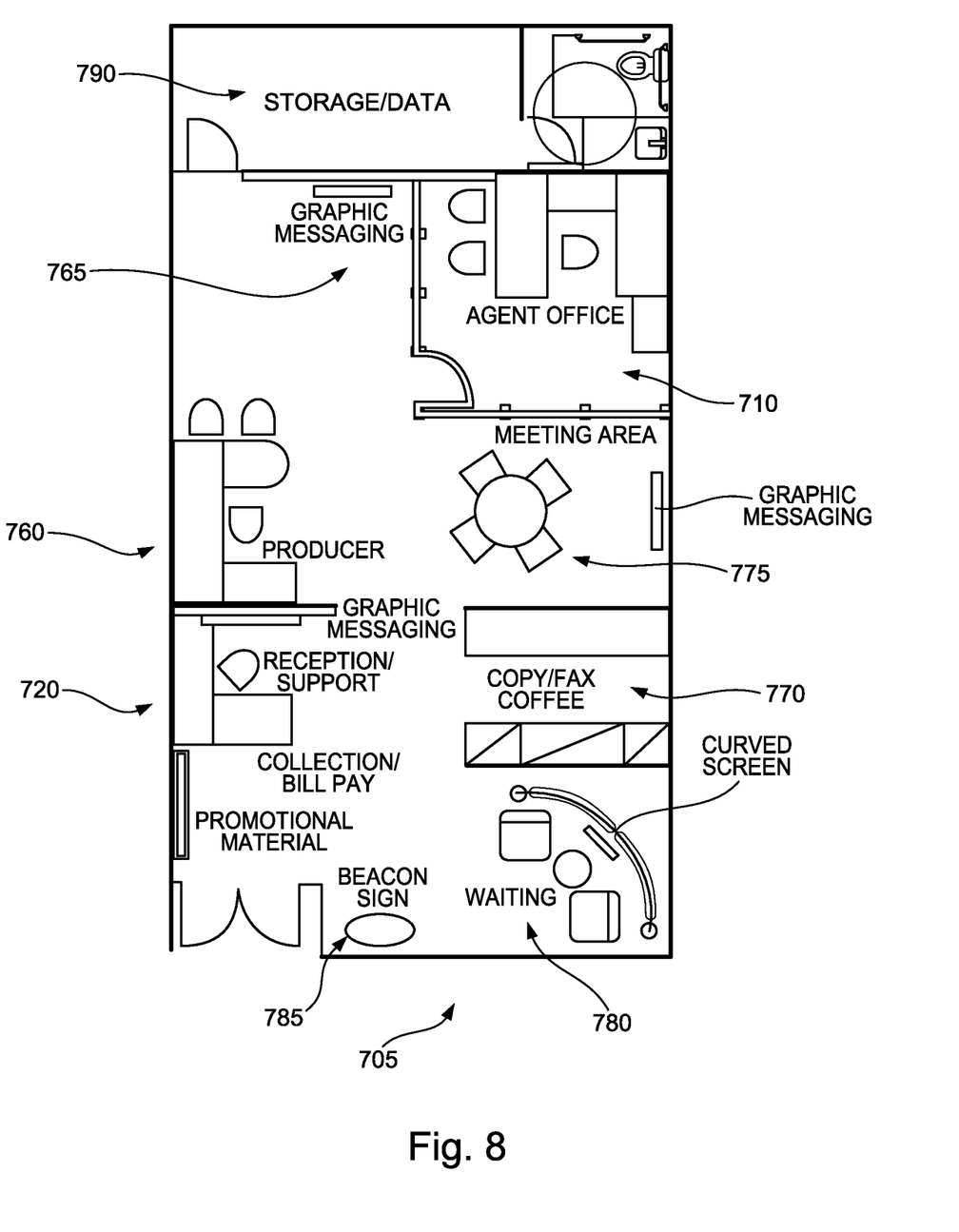
FIG. 8 illustrates an alternative embodiment of a retail location in accordance with an aspect of the present invention.

FIG. 8 illustrates an additional embodiment of a retail location 705 illustrating additional features that may be provided. As depicted, the retail location 705 can include producer office 760, which may be a partitioned office, one or more graphic messaging areas 765, a coffee/fax/copy station 770, a conference area 775, a waiting area 780 and a beacon sign 785. A storage/data area 790 also may be provided.

It should be noted that various features of FIGS. 7 and 8 may be combined to provide a different retail location 705 configuration. Furthermore, not all features need be included in a retail location 705. Instead, the retail location can be configured to aid in providing the appropriate functionality so that customers can be properly served. It is noted that a retail location may initially start with a first configuration but as more customers are helped, the retail location may need to be transformed to a second larger configuration. For example, additional offices may need to be added. Therefore, it may advantageous to select a site that provides the option of expanding the size of the retail location 705 after a period of time.

Several embodiments of the invention are provided below. These examples describe only versions of a few embodiments of the invention. The invention is not limited to the examples described below and includes numerous additional embodiments and versions. The examples should not be read to limit the disclosure of the invention in this application.

In an exemplary embodiment, an operative retail location is developed using a method with a simultaneous two-track development process. The method comprises developing a retail location in a first track of development, the first track including determining a site for the retail location; providing feedback regarding the progress of a build out of the retail location; and linking the retail location to company database. The method also comprises determining that an agency principal is ready to manage the retail location in a second track of development, the second track including determining that the agency principal passes a screening process; and determining the agency principal has met the minimum qualifications. In the method, the first track and the second track are initiated and concluded substantially simultaneously.

In an embodiment, a retail location for an agency principal is prepared using a method that includes determining a site location based on a market evaluation; receiving a selection for a set of services for developing the retail location; determining a timeline for building out the retail location; providing feedback on the build out process to the agency principal; and linking the retail location to a company database. The market evaluation includes determining at least two possible sites in a region that meet a predetermined minimum criteria; determining a value for each of at least three variables for each site; and determining a site score for each site based, at least in part, on the sum of the values of the at least three variables. The determining a timeline includes determining a development timeline for building out the retail site based on task inputs; and synchronizing the development timeline with a training program for the agency principal.

In an embodiment, a turn-key retail location is provided to an agency principal using a method including selecting a geographic area; obtaining a selection of a plurality of available sites in the geographic area; determining the preferred site among the selection of available sites based on a site score for each site; determining a build out plan using the requirements for building out the preferred site in accordance with a predetermined design plan; and providing information on the progress of the build out of the retail location. The obtaining of a selection of a plurality of available sites includes receiving information regarding the plurality of available sites over a network; and determining values for at least three variables for each of the plurality of sites, the values determined by the information received over the network. The selecting of a geographic area includes receiving population information about a geographic region; and determining an area within the geographic region that provides acceptable access to a substantial portion of people in the geographic region.

Thus, embodiments of the invention are disclosed. One skilled in the art will appreciate that the above teachings can be practiced with embodiments other than those disclosed. The disclosed embodiments are presented for purposes of illustration and not limitation, and the inventions are limited only by the claims that follow.

What is claimed is:

1. A system comprising:
 a data solutions transaction manager computer having at least one processor configured to determine a site for a retail location based on a site score for each of a plurality of potential locations, the site score for each of the plurality of potential locations generated by weighting one or more variables, the plurality of potential locations identified within an area determined for placement of the retail location; and a communications module of the data solutions transaction manager computer in communication with a computer and a camera over a network, the communications module transmitting a development progress of the retail location at the site to the computer for monitoring along a first track, the development progress including a remote view captured by controlling the camera, the data solutions transaction manager computer generating a second track for preparing an individual to manage the retail location using the computer, the individual selected from a pool of potential principals.

2. The system of claim 1, wherein the first track is separate from the second track.

3. The system of claim 1, wherein the first track and the second track are concluded substantially simultaneously.

4. The system of claim 1, wherein the first track and the second track are initiated substantially simultaneously.

5. The system of claim 1, wherein the area is determined based on at least one of geographical features of the area or demographics corresponding to the area.

6. The system of claim 1, wherein the area is determined based on one or more preexisting retail locations.

7. The system of claim 1, wherein the data solutions transaction manager computer automatically identifies the pool of potential principals based on one or more predetermined qualifications and the area.

8. The system of claim 7, wherein the individual is selected from the pool of potential principals based on the area and licensing.

9. A method comprising:
identifying an area for placement of a retail location using at least one processor of a data solutions transaction manager computer;
identifying a plurality of potential locations within the area using the at least one processor of the data solutions transaction manager computer;
generating a site score for each of the plurality of potential locations using the at least one processor of the data solutions transaction manager computer, the site score for each of the plurality of potential locations generated by weighting one or more variables;
determining a site for the retail location based on the site score for each of the plurality of potential locations;
generating a development progress of the retail location at the site using the at least one processor of the data solutions transaction manager computer, the development progress monitored along a first track and including a remote view captured by controlling a camera connected to a communications module of the data solutions transaction manager computer; and
generating a second track for preparing an individual to manage the retail location using the at least one processor of the data solutions transaction manager computer, the individual selected from a pool of potential principals based on the area.

10. The method of claim 9, wherein the first track being separate from the second track.

11. The method of claim 9, wherein the first track and the second track are at least one of concluded or initiated substantially simultaneously.

12. The method of claim 9, wherein the area is determined based on at least one of geographical features of the area or demographics corresponding to the area.

13. The method of claim 9, wherein the area is determined based on one or more preexisting retail locations.

14. The method of claim 9, wherein the data solutions transaction manager computer automatically identifies the pool of potential principals based on one or more predetermined qualifications and the area.

15. The method of claim 14, wherein the individual is selected from the pool of potential principals based on the area and licensing.

16. One or more tangible non-transitory computer-readable storage media storing computer-executable instructions for performing a computer process on a computing system, the computer process comprising:
identifying an area for placement of a retail location;
identifying a plurality of potential locations within the area;
generating a site score for each of the plurality of potential locations by weighting one or more variables;
determining a site for the retail location based on the site score for each of the plurality of potential locations;
generating a development progress of the retail location at the site, the development progress monitored along a first track and including a remote view captured by controlling a camera connected to a communications module of the data solutions transaction manager computer; and
generating a second track for preparing an individual to manage the retail location, the individual selected from a pool of potential principals based on the area, the first track being separate from the second track.

17. The one or more tangible non-transitory computer-readable storage media of claim 16, wherein the area is determined based on at least one of geographical features of the area or demographics corresponding to the area.

18. The one or more tangible non-transitory computer-readable storage media of claim 16, wherein the area is determined based on one or more preexisting retail locations.

19. The one or more tangible non-transitory computer-readable storage media of claim 16, wherein the data solutions transaction manager computer automatically identifies the pool of potential principals based on one or more predetermined qualifications and the area.

20. The one or more tangible non-transitory computer-readable storage media of claim 19, wherein the individual is selected from the pool of potential principals based on the area and licensing.

* * * * *